Aug. 14, 1951     P. W. HAINKE     2,564,201
WHEEL ADJUSTMENT FOR LAWN MOWERS
Filed Nov. 4, 1946
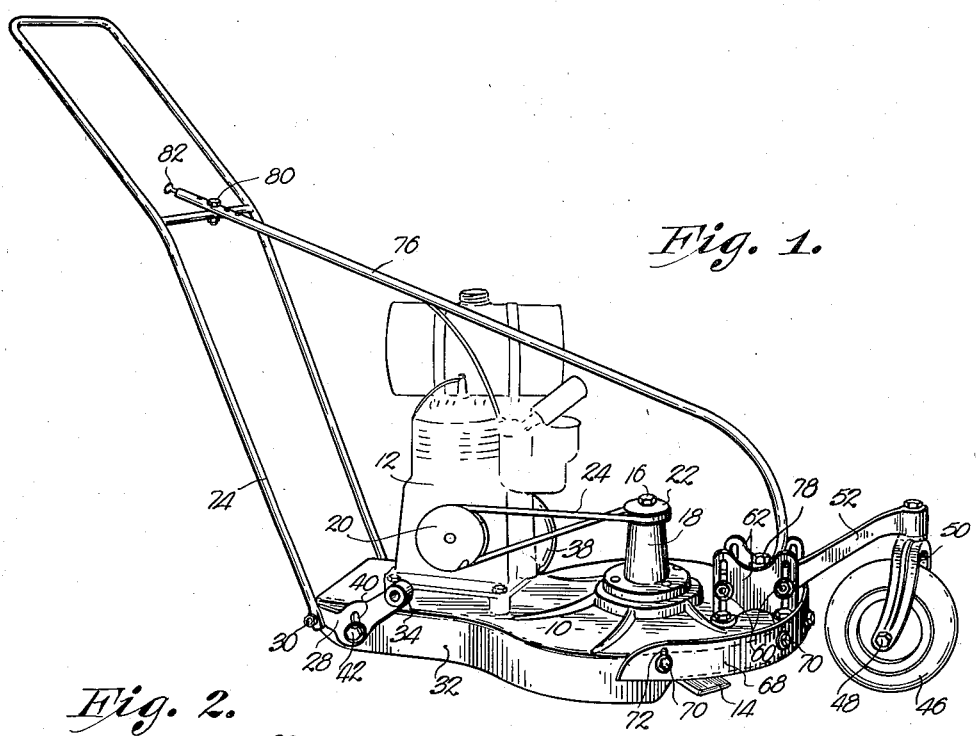
Fig. 1.
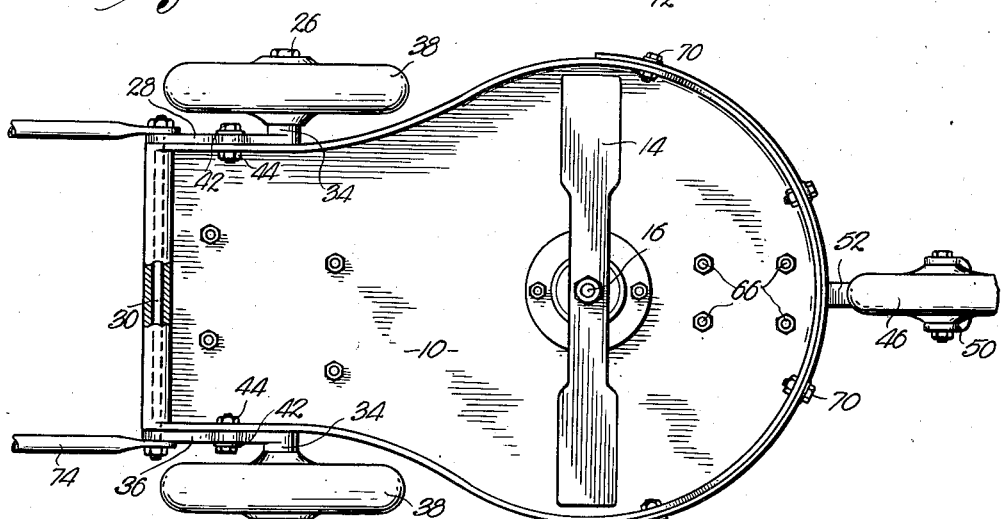
Fig. 2.
Fig. 3.
Inventor
Paul W. Hainke
By
Attorney Patented Aug. 14, 1951

2,564,201

UNITED STATES PATENT OFFICE 2,564,201

WHEEL ADJUSTMENT FOR LAWN MOWERS

Paul W. Hainke, Hutchinson, Kans., assignor to The Paul Hainke Mower Corporation, Inc., Hutchinson, Kans., a corporation of Kansas Application November 4, 1946, Serial No. 707,687

1 Claim. (Cl. 280—43)

This invention relates to cutting devices and particularly to lawn mowers of the kind having a wheel-supported platform provided with a rotatable cutting blade disposed in a substantially horizontal plane therebelow.

The primary aim of this invention is to provide a lawn mower of the above described kind having unique and quickly adjustable means for joining the wheel assemblies to the platform and formed to permit raising or lowering of the platform whereby the grass or the like to be cut is trimmed at a predetermined desired height.

An important object of this invention is to provide a lawn mower having slotted arms pivotally mounted on one end of the platform for attaching supporting wheels thereto and nut and bolt holding means passing through the slot and joined to the platform, and having a slotted bracket at the opposite end of the platform from which bracket extends an arm for attaching a guide wheel, all to the end that the platform may be shifted with respect to the wheels and the height of the cutting blade thereby determined.

Other objects relating to the purely structural details of the lawn mower will be made clear or become apparent during the course of the following specification, referring to the accompanying drawing, wherein:

Fig. 1 is a perspective view of a lawn mower made in accordance with the present invention, showing the same with one of the rear wheels removed for clearness.

Fig. 2 is a fragmentary top plan view thereof; and

Fig. 3 is a detailed view showing the manner of mounting the front mounting arm to one of the slotted brackets.

In the drawing, a platform generally designated by the numeral 10 supports a prime mover 12 for driving a cutting blade 14 disposed for rotation in a substantially horizontal plane below platform 10. Blade 14 is fixed to the lowermost end of a vertical spindle 16 rotatable in a bearing housing 18 through the medium of pulleys 20 and 22 on engine 12 and spindle 16 respectively, and a connecting belt 24.

A pair of arms 26 and 28 are pivotally mounted at one end thereof to a shaft 30 passing through a down-turned flange 32 on platform 10 and at the normally rear end thereof. The opposite ends of arms 26 and 28 have enlarged, perforated bosses 34 for receiving axles 36 of wheels 38, there being a wheel and axle assembly for each arm 26 and 28 respectively.

Each arm 26 and 28 is slotted as at 40 to receive threaded bolts 42 passing through flange 32 and having nuts 44 on one end thereof. Thus, it is readily seen that the rearmost end of platform 10 may be raised or lowered by simply loosening nuts 44 whereby bolts 42 may slide in their respective slots 40 and then retightening the same with platform 10 at the desired position.

An adjusting means is also provided to cooperate with the above described structure for a single front wheel 46, having an axle 48 and upright fork 50 joined to axle 48 at one end thereof and pivotally attached to the free end of an arm 52 at its opposite end to permit free swivelling movement of wheel 46.

This arm 52 has a vertical opening 54 for receiving fork 50 and a pair of spaced holes 56 through which pass bolts 58 having nuts 60 threaded thereon. A pair of upright brackets 62 each having spaced vertical slots 64 therein are mounted on the normally front end of platform 10 through bolts 66. Arm 52 is slidably disposed between brackets 62 and bolts 58 therein pass through corresponding slots 64. As nuts 60 are manipulated, platform 10 may be raised or lowered as bolts 58 slide in slots 64 and then secured in the desired position by tightening nuts 60.

For best operation of lawn mowers of this horizontal blade type, it is desirable to maintain blade 14 substantially parallel to the surface of the lawn being cut, therefore by movement of arms 26 and 28 and at the same time arm 52, such position of blade 14 may be maintained at any desired height within the range of slots 40 and slots 64 respectively.

Flange 32 is cut away along the front of platform 10 as shown in Fig. 1 and a band 68 is adjustably mounted thereon through the medium of bolts 70 and slots 72 in band 68. This band 68 may be entirely removed for exceptionally tall weeds or grass. A handle bar 74 is pivotally mounted on shaft 30 and held by tubular rod 76 having one end fixed to arm 52 as at 78 and its opposite end adjustably mounted on handle bar 74 as at 80 to permit setting the latter at desired angles. Rod 76 also carries a speed control cable 82 for engine 12 in each reach of the operator.

Lawn mowers of the class above described may be made without departing from the spirit of this invention, therefore, it is desired to be limited only by the scope of the appended claim.

Having thus described the invention, what is claimed as new and desired to be secured by Letters Patent is:

For a lawn mower platform having a pair of spaced side walls each provided with a pair of spaced openings, an elongated, screw-threaded shaft interconnecting said side walls and extending through one of the openings thereof; a substantially L-shaped mounting bracket on the outermost face of each side wall respectively, each bracket having a hole at one end thereof receiving said shaft, an arcuate slot intermediate the ends thereof concentric with said hole and aligned with the other opening of its corresponding side wall, and a perforated, axle-receiving boss at the opposite end thereof; a bolt extending through each of said other openings and arcuate slots respectively; and nuts on the shaft and on the bolts for holding the brackets tightly against said side walls.

PAUL W. HAINKE.

REFERENCES CITED

The following references are of record in the file of this patent:

UNITED STATES PATENTS

| Number | Name | Date |
|---|---|---|
| 471,042 | Warren | Mar. 15, 1892 |
| 856,697 | Hare et al. | June 11, 1907 |
| 1,396,128 | Kopplin | Nov. 8, 1921 |
| 1,482,527 | Simpson | Feb. 5, 1924 |
| 1,741,709 | Orr | Dec. 31, 1929 |
| 1,992,494 | Lundin | Feb. 26, 1935 |
| 2,165,551 | Iverson | July 11, 1939 |
| 2,263,368 | Sejkora | Nov. 18, 1941 |
| 2,308,076 | Hainke | Jan. 12, 1943 |